(12) United States Patent
Ji et al.

(10) Patent No.: US 12,160,261 B2
(45) Date of Patent: *Dec. 3, 2024

(54) DISTRIBUTED FIBER OPTIC SENSOR PLACEMENT WITH SHARED PROTECTION

(71) Applicant: NEC Laboratories America, Inc., Princeton, NJ (US)

(72) Inventors: Philip Ji, Cranbury, NJ (US); Ting Wang, West Windsor, NJ (US); Zilong Ye, LaVerne, CA (US)

(73) Assignee: NEC Corporation, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 18/075,374

(22) Filed: Dec. 5, 2022

(65) Prior Publication Data

US 2023/0179297 A1 Jun. 8, 2023

Related U.S. Application Data

(60) Provisional application No. 63/286,200, filed on Dec. 6, 2021.

(51) Int. Cl.
*H04B 10/032* (2013.01)
*H04J 14/02* (2006.01)

(52) U.S. Cl.
CPC ........ *H04B 10/032* (2013.01); *H04J 14/0287* (2013.01)

(58) Field of Classification Search
CPC .... H04B 10/03; H04B 10/032; H04B 10/038; H04B 10/07–0799; H04J 14/0287–0297
USPC ...................................................... 398/1–25
See application file for complete search history.

(56) References Cited

U.S. PATENT DOCUMENTS

| | | | | |
|---|---|---|---|---|
| 11,742,939 B2* | 8/2023 | Ji | ............................ | H04B 10/07 398/1 |
| 2002/0097680 A1* | 7/2002 | Liu | ........................... | H04Q 3/66 370/386 |
| 2013/0216225 A1* | 8/2013 | Patel | ...................... | H04J 14/021 398/49 |
| 2018/0340801 A1* | 11/2018 | Kelley | ................... | B61L 25/021 |

* cited by examiner

*Primary Examiner* — Li Liu
(74) *Attorney, Agent, or Firm* — Joseph Kolodka (57) ABSTRACT

Aspects of the present disclosure describe distributed fiber optic sensor systems, methods, and structures that advantageously enable/provide for the proper placement/assignment of sensors in the DFOS network to provide for high reliability, fault tolerant operation that survives multiple fiber failures.

10 Claims, 10 Drawing Sheets

DISTRIBUTED FIBER OPTIC SENSOR PLACEMENT WITH SHARED PROTECTION

CROSS REFERENCE

This application claims the benefit of U.S. Provisional Patent Application Ser. No. 63/286,200 filed 6 Dec. 2021 the entire contents of which being incorporated by reference as if set forth at length herein.

TECHNICAL FIELD

This disclosure relates generally to fiber optic telecommunications networks and distributed fiber optic sensing (DFOS) systems, methods, and structures. More specifically, it pertains the efficient deployment of DFOS sensors for reliable service and tolerance/immunity to link failure(s).

BACKGROUND

Empowered by the rapid advancement of fiber optic sensing techniques recently, network carriers can upgrade their network infrastructure with sensing applications and services (e.g., monitoring traffic, road condition, etc.)—in addition to providing communication services—thus achieving a paradigm known in the art as "Infrastructure-as-a-Sensor" (IaaSr).

While such sensor upgrades and resulting services have found widespread applicability, the network infrastructure(s) remain vulnerable to a variety of failures including link failures that may result from fiber cuts. A critical challenge then for IaaSr service providers is how to efficiently deploy DFOS sensors that are tolerant of and/or immune to failure to achieve and provide a reliable level of IaaSr service.

SUMMARY

An advance in the art is made according to aspects of the present disclosure directed to DFOS systems, methods, and structures that advantageously provide for the proper placement/assignment of sensors in a DFOS network to provide for high reliability, fault tolerant operation that survives fiber failures.

In sharp contrast to the prior art, our inventive DFOS systems and methods according to aspects of the present disclosure provide a survivable DFOS network that maintains DFOS service availability even when multiple failures occur in the DFOS network.

As used herein, service availability is defined as the ratio of the number of links that are still operational—being sensed/covered—over the total number of links, when multiple failures occur.

As we shall show and describe, our inventive procedures provide shared protection with minimum set cover (Shared-MSC), which achieves a high service availability for IaaSr/NaaSr systems as compared with the prior art during periods of multiple link failures.

Advantageously, our inventive shared-MSC procedure requires only a relatively few additional DFOS sensors to recover from such multiple failures.

As we shall show and describe, our inventive shared-MSC procedure includes two main steps. Firstly, shared-MSC determines an optimal DFOS placement for covering all links in a physical optical network infrastructure, which serve as primary DFOS placement. Secondly, shared-MSC determines all possible fiber sensing routes (constrained by the sensing range limit) on each node and considers them as candidates for primary DFOS assignment. Then, Shared-MSC adopts a greedy minimum set cover algorithm to select a minimum set from all backup candidates, which produces an optimal backup DFOS assignment.

In this inventive manner way, each link is sensed (or covered) at least once from each direction, which advantageously recovers from multiple failures that occur simultaneously.

Note that, in shared-MSC, for any particular links that are shared by multiple primary fiber sensing routes, shared-MSC allocates backup fiber sensing services that are equal to or greater than primary fiber sensing services, such that each physical link is sensed/covered at least once from each sensing direction.

As will become apparent to those skilled in the art, our inventive procedure achieves a high service availability under multiple failures, only requires a small number of additional DFOS sensors to recover from multiple failures, determines where to place primary DFOS sensors to cover all physical links in an IaaSr/NaaSr infrastructure, determine primary fiber sensing routes (including the assignment of the routing and the sensing range) for each deployed primary DFOS sensor, and determine backup fiber sensing routes (including the assignment of the routing and sensing range) for chosen backup DFOS sensors when multiple failures occur.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

Figure 1:
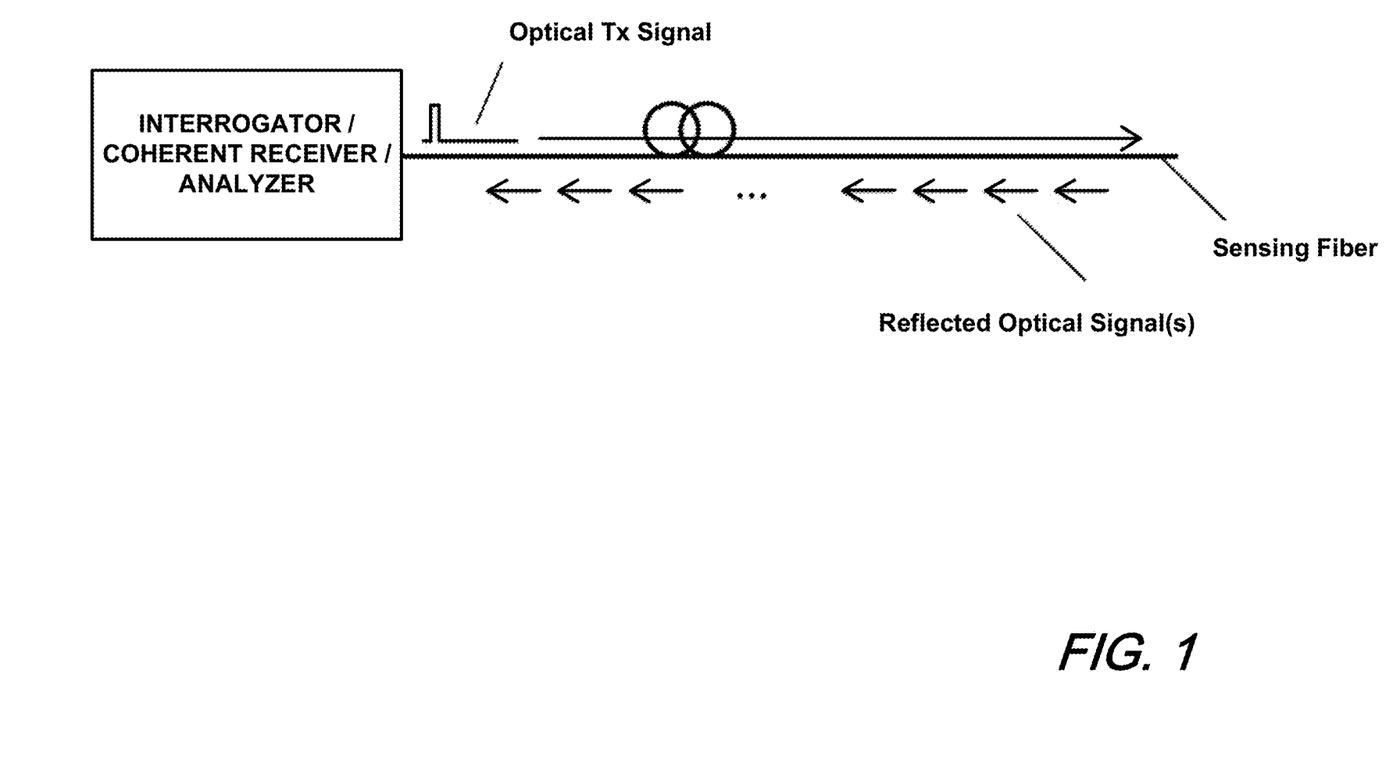
FIG. 1 is a schematic diagram showing an illustrative DFOS system according to aspects of the present disclosure.

FIG. 1 is a schematic diagram of a generalized, DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing (DAS) or distributed vibration sensing (DVS)) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest in integrating communications systems and sensing systems on a common fiber that may be part of a larger, multi-fiber cable or a common fiber that simultaneously carries live telecommunications traffic in addition to the DFOS data.

Operationally, we assume that the DFOS system will be Rayleigh-scattering based system (e.g., distributed acoustic sensing or distributed vibration sensing) and Brillouin-scattering based system (e.g., Brillouin optical time domain reflectometry or BOTDR) and may include a coding implementation. With such coding designs, such systems will be most likely be integrated with fiber communication systems due to their lower power operation and will also be more affected by the optical amplifier response time.

As previously noted, application of DFOS has advanced rapidly. DFOS sensors are now deployed to monitor road traffic conditions, detect automobile accidents, and monitor utility pole health—leading to a new paradigm of Infrastructure-as-a-Sensor (IaaSr) or Network-as-a-Sensor (NaaSr). Similar to computer network systems and power grid systems, IaaSr/NaaSr systems suffer from various hardware/software failures, which presents a challenge to the deployment and operation of IaaSr/NaaSr systems.

In this disclosure we describe a novel procedure we call shared protection with minimum set cover (Shared-MSC), which achieves a relatively high service availability for IaaSr/NaaSr systems experiencing multiple failures. Additionally and advantageously, our shared-MSC procedure requires only a relatively low number of additional DFOS sensors to recover from such multiple failures.

Figure 2:
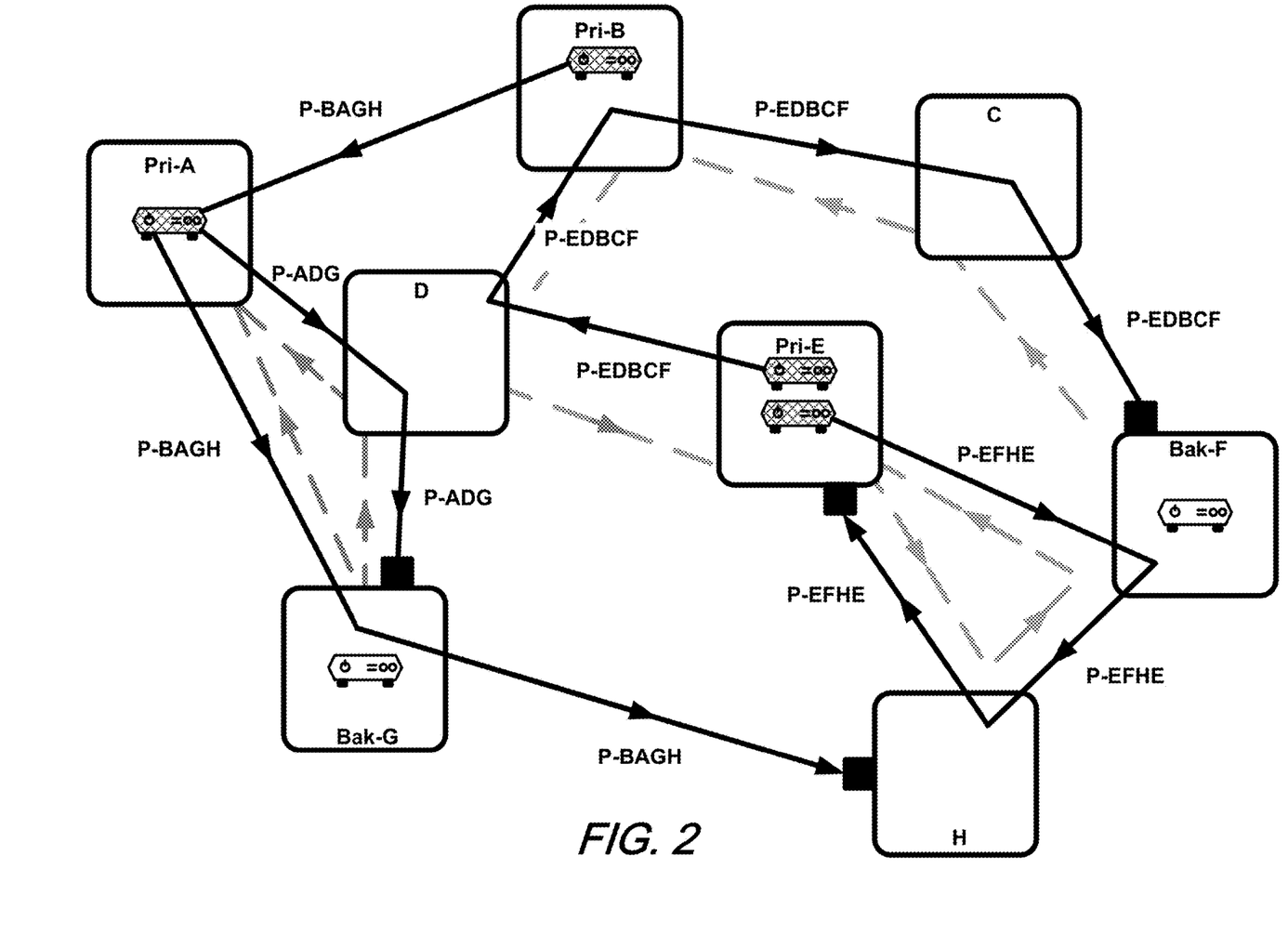
FIG. 2 is a schematic diagram showing an illustrative DFOS network topology including primary and backup DFOS nodes and fiber links according to aspects of the present disclosure.
Figure 3A:
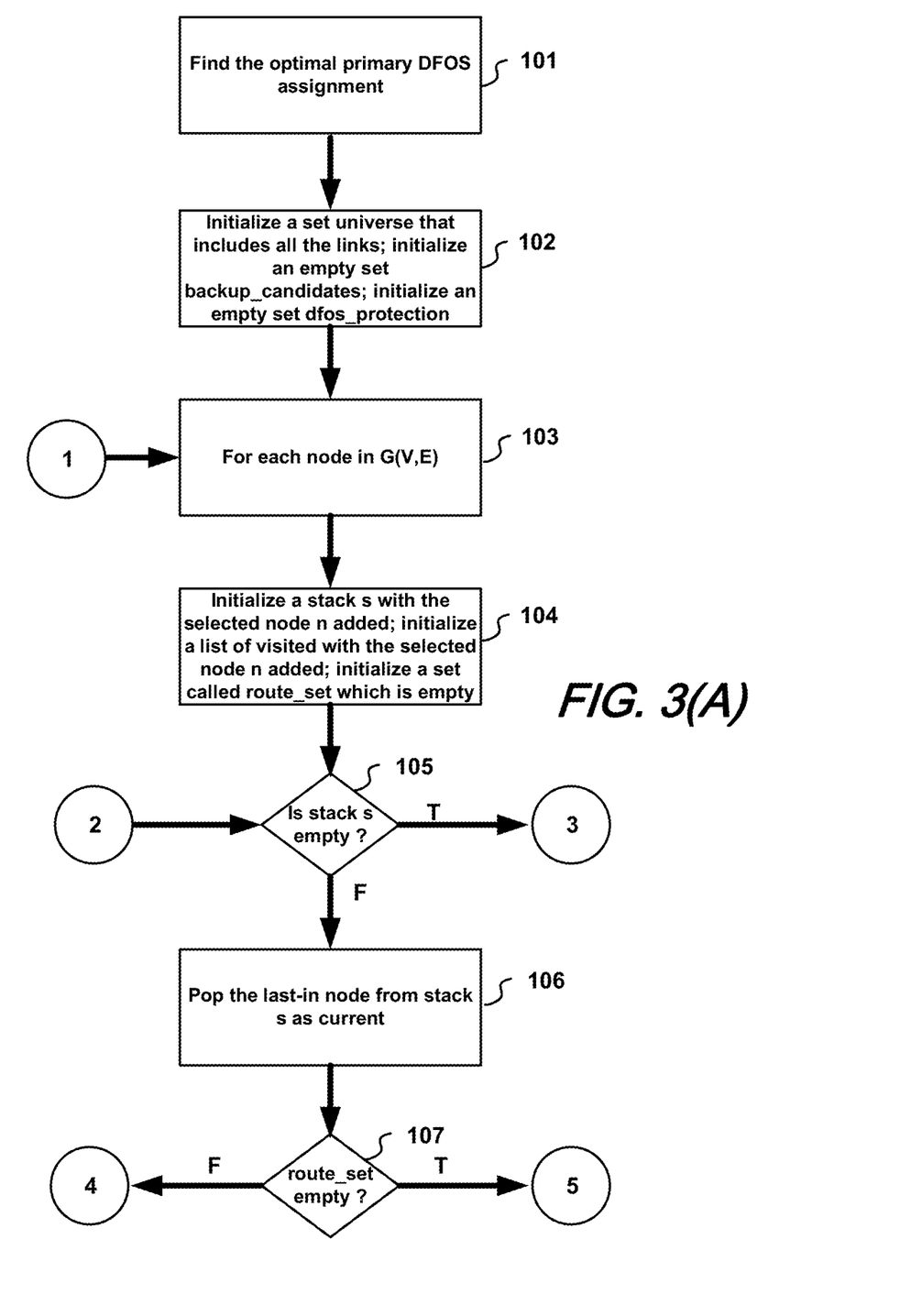
FIG. 3(A), FIG. 3(B), FIG. 3(C), FIG. 3(D), and FIG. 3(E) are a series of flow charts illustratively showing an operational procedure according to aspects of the present disclosure.
Figure 3B:
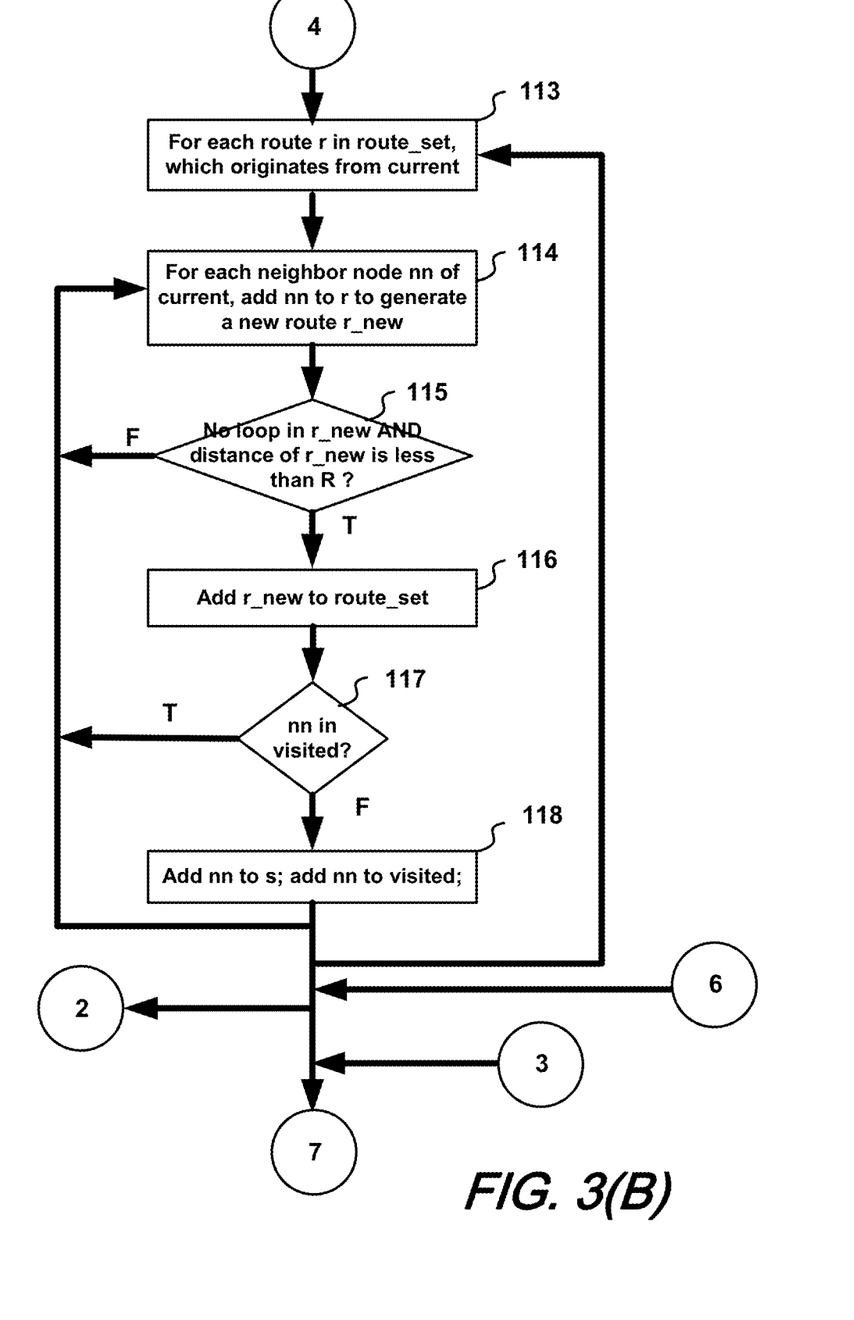
Figure 3C:
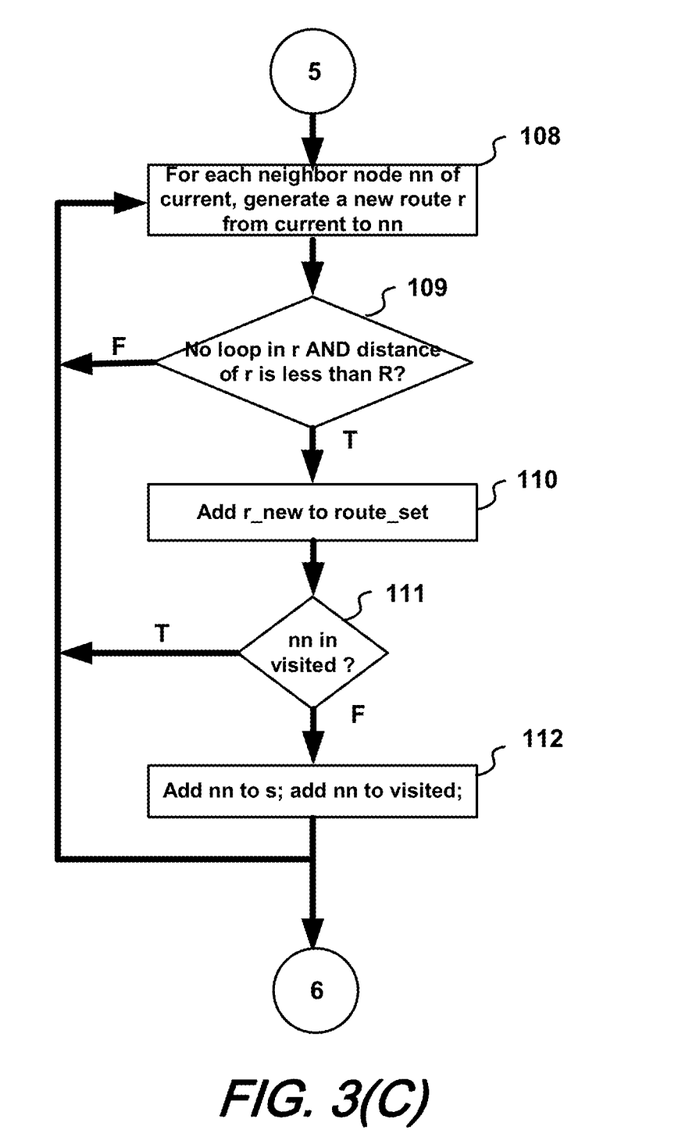
Figure 3D:
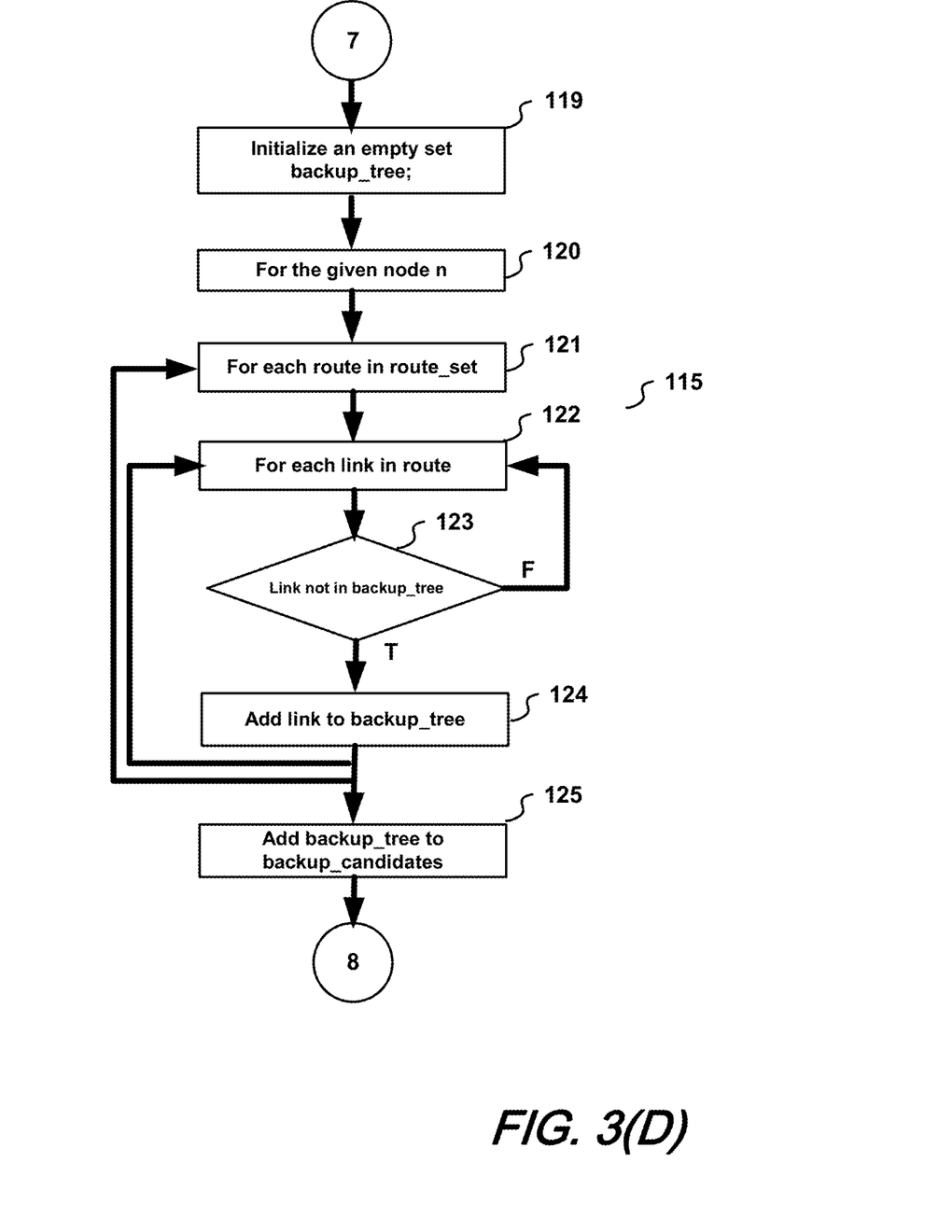
Figure 3E:
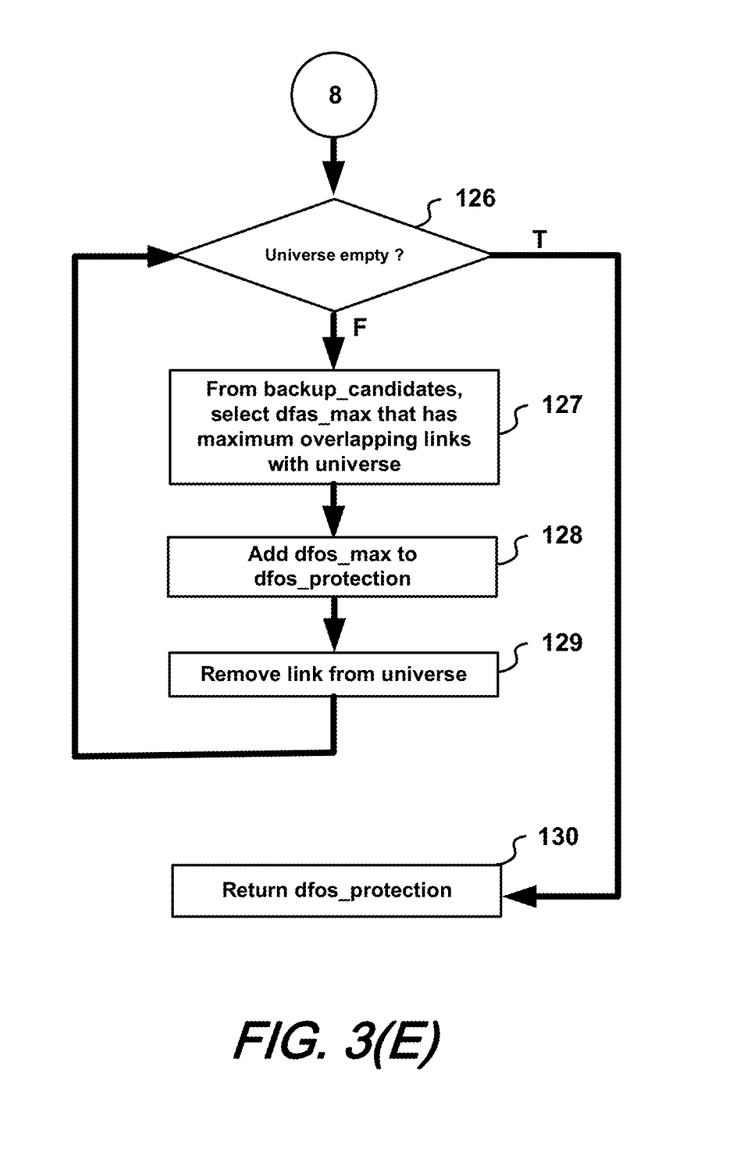

FIG. 2 is a schematic diagram showing an illustrative DFOS network topology including primary and backup DFOS nodes and fiber links according to aspects of the present disclosure.

With reference to that figure, it may be understood that our inventive shared-MSC procedure provides shared protection thereby protecting multiple primary sensing fiber routes originating from several primary DFOS sensors.

As shown in FIG. 2, four DFOS sensors are deployed at Nodes A, B, and E (note that there are two sensors at Node E) as primary sensors. The corresponding primary fiber sensing routes are {A: A-G-H}, {B: B-A-D-G}, {E1: E-F-H-E}, and {E2: E-D-B-C-F}. We can observe from the figure that all the links are sensed (or covered) by this primary DFOS assignment.

To provide a reliable IaaSr service, two backup DFOS sensors are deployed at node F and G. Since they are for backup protection purpose, the corresponding backup fiber sensing routes are in a tree-like structure, rather than linear routes. In this way, a backup sensing route tree can provide backup protection to a number of primary fiber sensing routes, which is a shared protection scheme that yields to a smaller number of sensors used. In FIG. 1, the backup fiber sensing trees are {G: GAB-GDA-GDE} and {F: FCBD-FEHF-FEHG}. In case of a link failure (e.g., fiber cut), the original primary sensor will continue to sense its assigned links as much as possible, while a backup sensor and a branch on the corresponding backup fiber sensing tree will be used to recover the sensing service for the remaining segment of the broken link from the opposite direction compared to the primary sensing route.

Our inventive shared-MSC procedure includes two main steps. Firstly, shared-MSC determines an optimal DFOS placement for covering all links in a physical optical network infrastructure, which serve as primary DFOS placement. Secondly, shared-MSC determines all possible fiber sensing routes (constrained by the sensing range limit) on each node and considers them as candidates for primary DFOS assignment. Then, Shared-MSC adopts a greedy minimum set cover algorithm to select a minimum set from all backup candidates, which produces an optimal backup DFOS assignment.

In this inventive manner way, each link is sensed (or covered) at least once from each direction, which advantageously recovers from multiple failures that occur simultaneously.

Note that, in shared-MSC, for any particular links that are shared by multiple primary fiber sensing routes, shared-MSC allocates backup fiber sensing services that are equal to or greater than primary fiber sensing services, such that each physical link is sensed/covered at least once from each sensing direction.

As will become apparent to those skilled in the art, our inventive procedure achieves a high service availability under multiple failures, only requires a small number of additional DFOS sensors to recover from multiple failures, determines where to place primary DFOS sensors to cover all physical links in an IaaSr/NaaSr infrastructure, determine primary fiber sensing routes (including the assignment of the routing and the sensing range) for each deployed primary DFOS sensor, and determine backup fiber sensing routes (including the assignment of the routing and sensing range) for chosen backup DFOS sensors when multiple failures occur.

FIG. 3(A), FIG. 3(B), FIG. 3(C), FIG. 3(D), and FIG. 3(E) are a series of flow charts illustratively showing an operational procedure according to aspects of the present disclosure.

As we shall now describe in detail, our inventive procedure determines the DFOS protection assignments in a two-step manner. Firstly, our procedure determines an optimal primary DFOS assignment. Secondly, our inventive procedure determines an optimal backup DFOS assignment (Step 102 to Step 130 as shown below). The detailed steps are presented below.

Figure 4A:
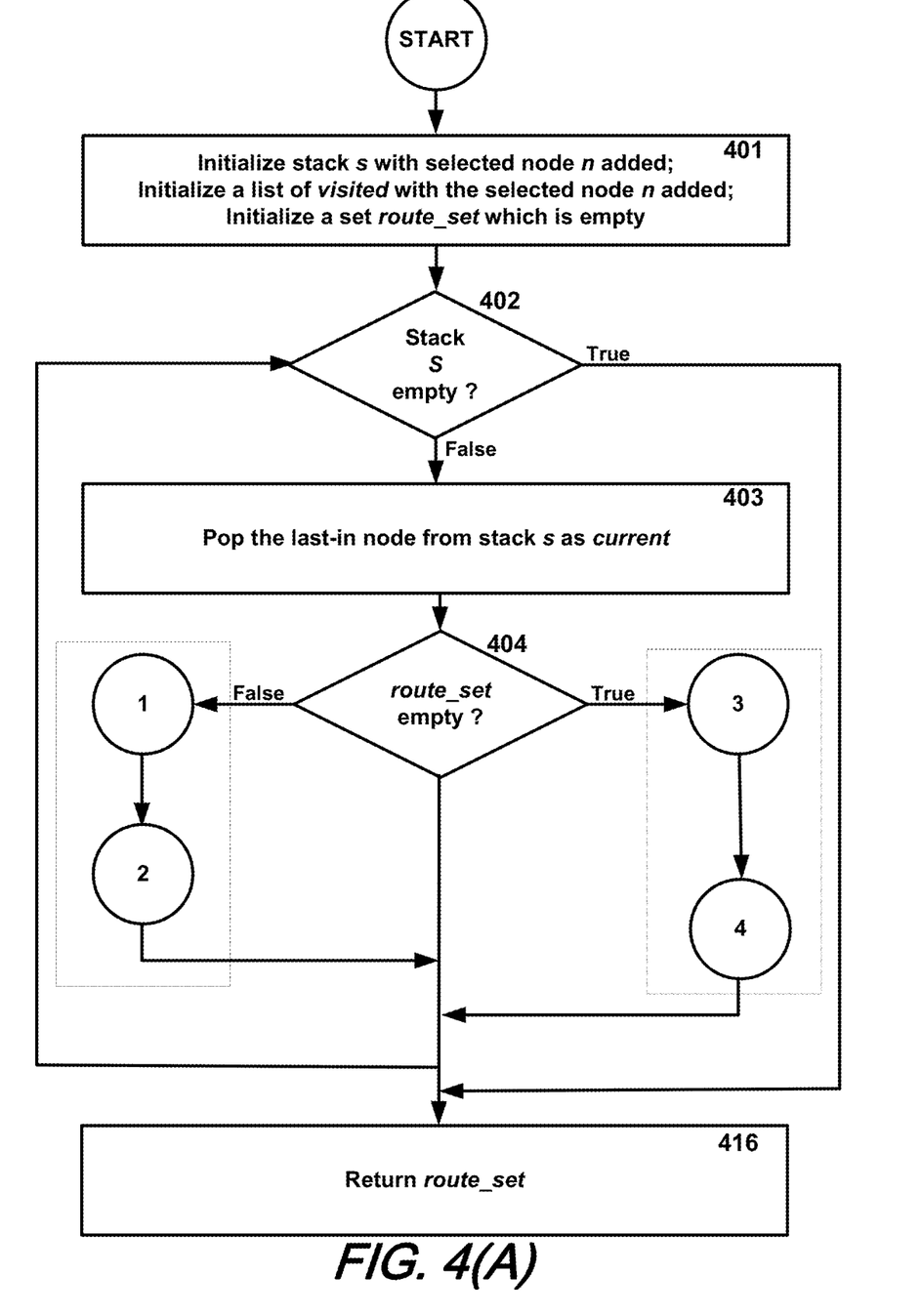
FIG. 4(A), FIG. 4(B), and FIG. 4(C) are series of flow charts illustrating overall operation of the procedure that determines the primary DFOS Assignments according to aspects of the present disclosure.
Figure 4B:
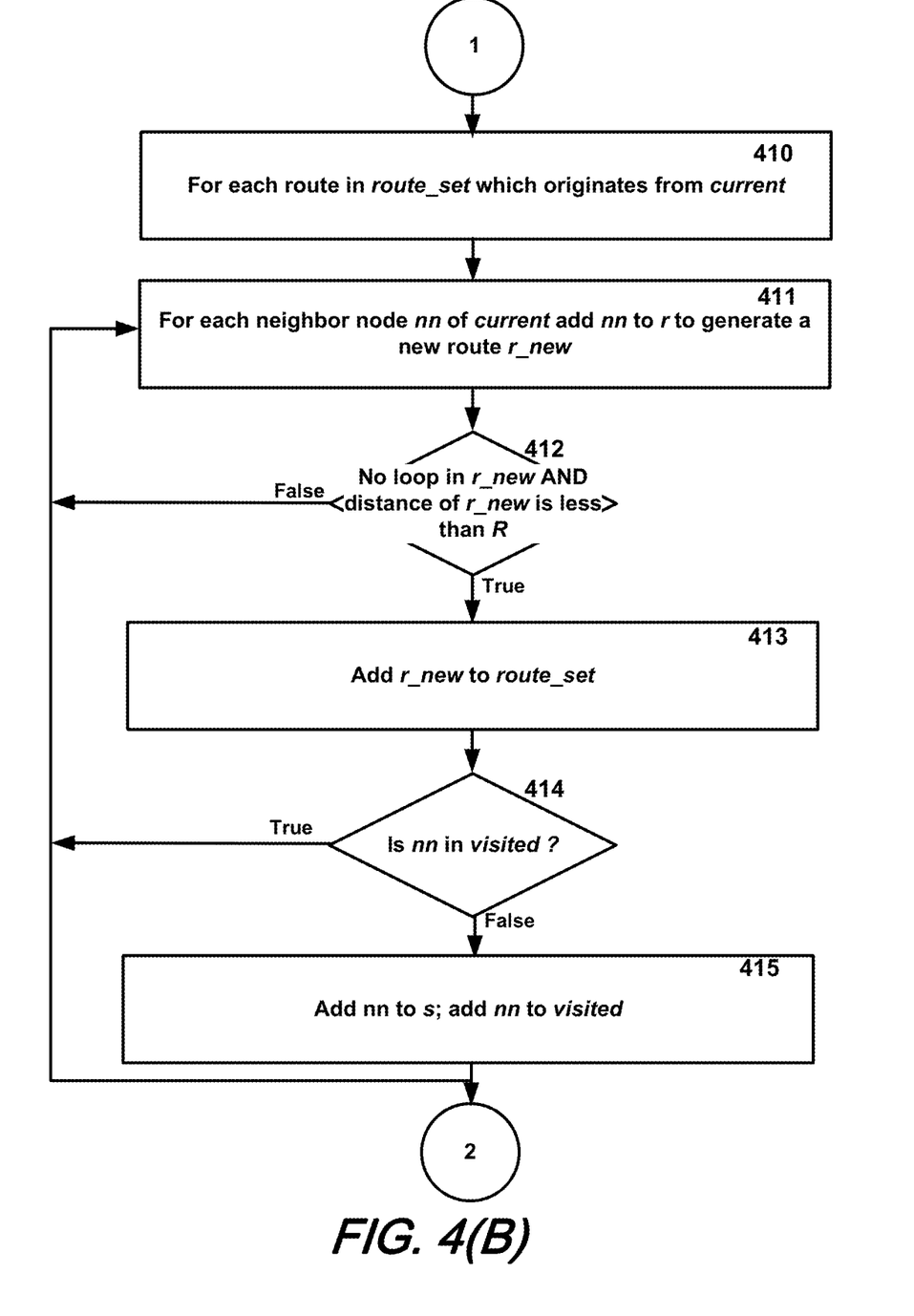
Figure 4C:
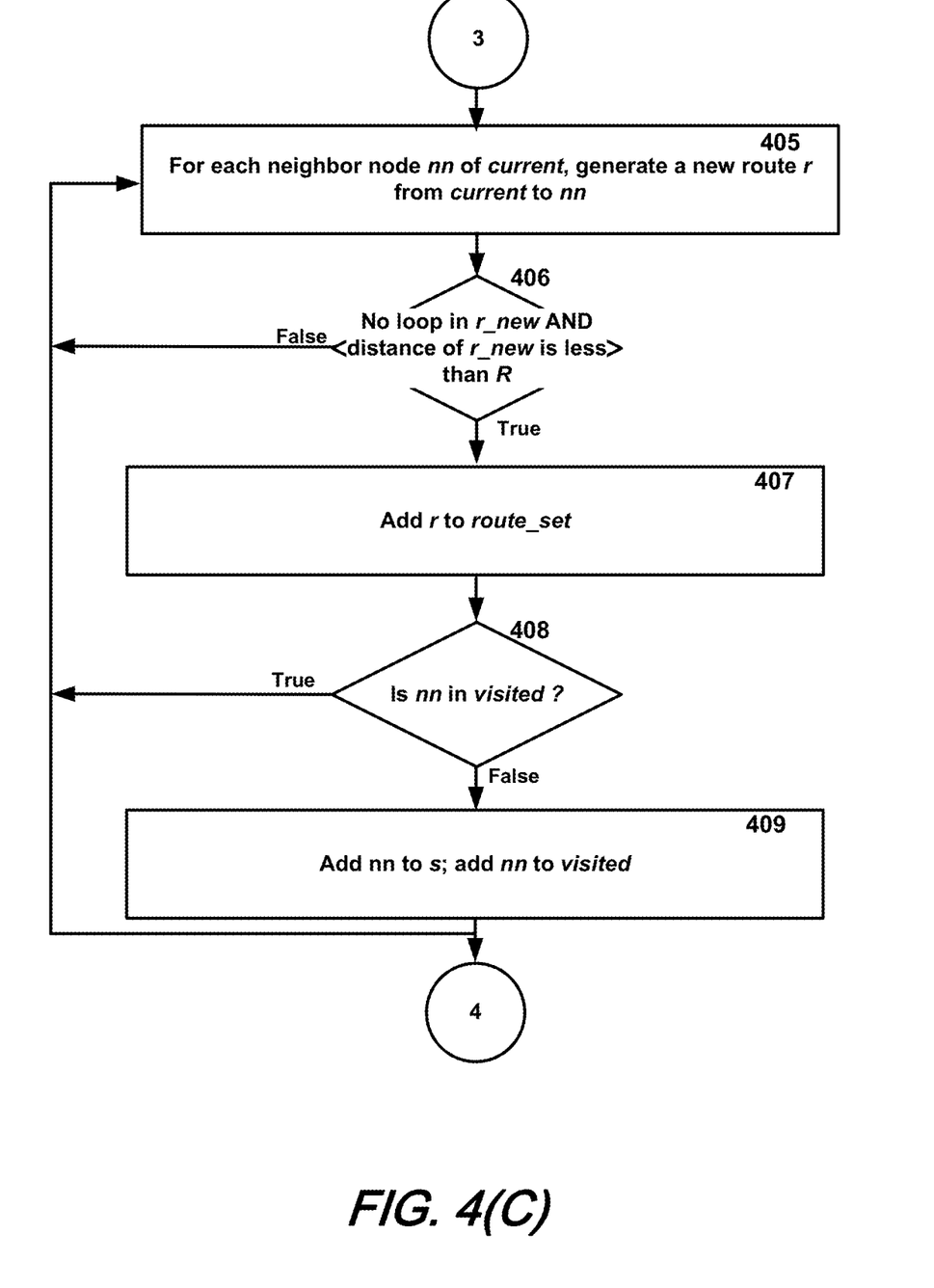

Step 101: this step determines the optimal primary DFOS assignment by applying the procedure shown FIG. 4(A)-FIG. 4(C).

Step 102: this step is the initialization step for determining the optimal backup DFOS assignment. Three data structures are created and initialized. First, a set universe is initialized with all the physical links in the given physical infrastructure. Secondly, a set backup_candidates is initialized with an empty set, which will be used to store the candidate backup DFOS protection assignment. Thirdly, a set dfos_protection is initialized as an empty set, which will be used to store the optimal backup DFOS assignment.

Step 103: this step is the entering point of a for loop. It will process each physical node on the given physical infrastructure using Step 1 to Step 125. When all the physical nodes are done with the processing, the procedure will proceed to Step 126.

Step 104: this step is the initialization step for depth-limited route exploration. Three data structures are created and initialized. First, a stack s is created to store all the nodes that need to be visited for the given node n. The stack will be initialized with the given node n, and it will be added with additional nodes when the nodes meet certain conditions (see Step 109 and 111, and step 115 and 118). Secondly, a list called visited will be initialized to keep track of the nodes that have been visited during the depth-limited route exploration process. This will ensure that there will be no duplicated sensing route in the final DFOS protection assignment. The list is initialized to contain the given node n. Finally, a set called route_set is initialized as empty, which will contain all the possible fiber sensing routes (linear routes) if we deploy a sensor at the given node n.

Step 105: this step is the entering point of a while loop. It will check if stack s is empty or not. If the stack is not empty, it will enter the while loop and continue to step 106. If the stack is empty, it will quit the while loop and go to step 119. Here, when the stack is empty, it means that all the neighboring nodes that are within the sensing limit for the given node n have been checked, so route_set contains all the possible sensing route for the given node n.

Step 106: this step will pop up the last-in node from stack s, and denoted it as node current. This current node shows where the current exploration is located at. Future steps will determine whether or not to add current and its neighbors as a possible sensing routes in route_set.

Step 107: this step will check if set route_set is empty or not. If it is empty, we will consider node current to be the original node of the sensing route and further explore any other possible sensing routes, as we proceed to step 108. If route_set is not empty, then we will check the routes from route_set whose predecessor is current, and further explore any other possible sensing routes, as we proceed to step 113.

Step 108: this step is the entering point of a for-loop. We need to check each neighbor node nn of current and generate a route r from current to nn. This route will be checked in step 109 to determine whether or not it will be added to route_set.

Step 109: this step checks the condition of route r that is extended from current to nn. The condition is that route r must be a linear route that contains no loop, and in the meantime, the distance traveled by r is less than the sensing range limit. If route r satisfies the above condition, we will add r to route_set as shown in step 110. If the condition is not met, the procedure will go back to step 108 and check the next neighbor node and its corresponding newly generated route.

Step 110: this step will add the route r to the set of route_set.

Step 111: this step will check if neighbor node nn has been visited or not. If nn has been visited before, then we will go back to step 108 and check the next neighbor node. If nn has not been visited, then we go to step 112.

Step 112: this step will add neighbor node nn to stack s, which allow us to further explore any other possible sensing route extended from this node. In this step, we will also add nn to the list of visited.

Step 113: this step will be executed when the condition in step 107 is not met. It is the entering point of the outer loop of a double for-loop. Here, we need to check each existing sensing route r in the set of route_set, and proceed with the ones that originate from node current.

Step 114: this step is the entering point of an inner loop of a double for-loop. We need to check each neighbor node nn of current and generate a new route r_new that is constructed by adding node nn to the existing sensing route r.

Step 115: this step checks whether or not route r_new is a linear route without a loop, and in the meantime, the distance traveled by r_new is less than the sensing limit. If the above condition holds true, then we proceed to step 116, where we add r_new to route_set. If the condition is not met, the procedure will go back to step 114 and check the next neighbor node and its corresponding newly generated route.

Step 116: this step will add the route r_new to the set of route_set.

Step 117: this step will check if neighbor node nn has been visited or not. If nn has been visited before, then we will go back to step 114 and check the next neighbor node. If nn has not been visited, then we go to step 118.

Step 118: this step will add neighbor node nn to stack s, which allow us to further explore any other possible sensing route extended from this node. In this step, we will also add nn to the list of visited.

Step 119: this step will be executed when the condition in step 105 holds true. It will =initialize a set called backup_tree, which is used to store the backup fiber sensing routing tree if a backup sensor is deployed at the given node n.

Step 120: this step continues to process the given node n to find out the possible candidate backup sensing routes for the given node n.

Step 121: this step is the entering point of an outer for-loop. It will check each route in route_set and repeat step 122 through step 124. If all the route items in route_set have been checked, go to step 125.

Step 122: this step is the entering point of an inner for-loop. It will check each link traveled through by the selected route and repeat step 123 and step 124. If all the link items in route have been checked, go back to step 121.

Step 123: this step checks if the selected link does not exist in backup_tree yet. If the link does not exist in backup_tree yet, go to step 124; otherwise, go back to step 122.

Step 124: this step adds the selected link to backup_tree.

Step 125: this step adds backup_tree to backup_candidates.

Step 126: this step is the entering point of a while-loop, which will be used to find out the optimal backup DFOS assignment from all the backup_candidates. If universe is empty, go to step 130; otherwise, repeat step 127 through step 129.

Step 127: this step examines each candidate from backup_candidates, and selects the DFOS assignment dfos_max, which has the maximum overlapping links with universe.

Step 128: this step adds the above selected dfos_max to the final reliable DFOS assignment result dfos_protection.

Step 129: this step removes link from universe.

Step 130: this step returns results in dfos_protection and the procedure terminates.

FIG. 4(A), FIG. 4(B), AND FIG. 4(C) are series of flow diagrams illustrating overall operation of the procedure that determines the primary DFOS Assignments according to aspects of the present disclosure.

This primary DFOS assignment sub-procedure as shown in the figure includes 16 steps as follows, the flowchart of which is shown in FIG. 4(A), FIG. 4(B), FIG. 4(C), and FIG. 4(C).

Step 401 is the initialization step of the sub-procedure of depth-limited route exploration. Three data structures are created and initialized. First, a stack s is created to store all identities of all nodes that need to be visited for a given node n. The stack is initialized with the given node n, and to it is added any additional nodes when the additional nodes meet certain conditions (see Steps 406 and 408, and Steps 412 and 414).

Second, a list called visited is initialized to keep track of nodes that have been visited during a depth-limited route exploration process. This ensures that there are no duplicated sensing route(s) in a final DFOS assignment.

The list is initialized to contain the given node n. Finally, a set called route_set is initialized as empty, which contains all possible fiber sensing routes (linear routes) if a sensor at the given node n is deployed.

Step 402: is the entering point of a while loop. It performs a check to determine if stack s is empty or not. If the stack is not empty, control enters the while loop and continues to Step 403. If the stack is empty, it forces a quit of the while loop and transfers control to Step 416 and returns the route_set for the given node n. Here, when the stack is empty, it means that all the neighboring nodes that are within the sensing limit for the given node n have been checked, so route_set contains all possible sensing routes for the given node n.

Step 403 pops the last-in node from stack s and denotes it as node current. This current node indicates where the current exploration is located at. Future steps determine whether or not to add current and its neighbors as possible sensing routes in route_set.

Step 404 checks if set route_set is empty or not. If it is empty, node current is the original node of the sensing route and operation will further explore any other possible sensing routes, as Step 405. If route_set is not empty, then operation checks the routes from route_set whose predecessor is current, and further explore any other possible sensing routes, a operation proceeds to Step 410.

Step 405 is the entry point of a for-loop. We need to check each neighbor node nn of current and generate a route r from current to nn. This route will be checked in step 106 to determine whether it will be added to route_set.

Step 406 checks the condition of route r that is extended from current to nn. A qualifying condition is that route r must be a linear route that contains no loop, and in the meantime, the distance traveled by r is less than the sensing range limit. If route r satisfies the above conditions, we will add r to route_set as shown in Step 407. If the condition is not met, the procedure will return to Step 405 and check the next neighbor node and its corresponding newly generated route.

Step 407 adds the route r to the set of route_set.

Step 408 checks if neighbor node nn has been visited or not. If nn has been visited before, then control returns to Step 405 and checks the next neighbor node. If nn has not been visited, then control continues at Step 409.

Step 409 adds neighbor node nn to stack s, which allows further exploration of any other possible sensing routes extended from this node. In this step, nn is added to the list of visited nodes.

Step 410 is executed when the condition in step 104 is not met. It is the entering point of the outer loop of a double for-loop. Here, we need to check each existing sensing route r in the set of route_set, and proceed with the ones that originate from node current.

Step 411 is the entry point of an inner loop of a double for-loop. At this point in the procedure we need to check each neighbor node nn of current and generate a new route r_new that is constructed by adding node nn to existing sensing route, r.

Step 412 this step checks whether or not route r_new is a linear route without a loop, and in the meantime, the distance traveled by r_new is less than the sensing limit. If the above condition holds true, then control proceeds at Step 413, where r_new is added to route_set. If the condition is not met, the procedure will return to Step 411 and check the next neighbor node and its corresponding newly generated route.

Step 413 adds the route r_new to the set of route_set.

Step 414 checks if neighbor node nn has been visited or not. If nn has been visited before, then control returns to Step 411 and checks the next neighbor node. If nn has not been visited, then control proceeds at Step 415.

Step 415 adds neighbor node nn to stack s, which allows further exploration of any other possible sensing route extended from this node. In this step, nn is added to the list of visited.

Step 416 is executed when the condition in Step 102 holds true. It returns route_set to where the procedure was called.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for distributed fiber optic sensing (DFOS) sensor placement with shared protection, the method comprising:
   providing a DFOS network having a plurality of nodes optically connected by a plurality of optical links, said network defined by G(V, E), where V is a set of end nodes, and E is a set of optical fiber links that serve as sensor fibers and connect the set of end nodes V, and G is subject to a multiple link failure;
   determining possible primary DFOS sensor assignments as primary_route_set;
   determining all backup DFOS sensor assignments as backup_route_set; and
   from the primary_route_set and the backup_route_set, selecting a minimum set that provides shared protection against the multiple link failure and provides sensor services without interruption during the multiple link failure;
   wherein the primary_route_set comprises primary_routes and the backup_route_set comprises backup_routes, the backup_routes exhibiting a tree topology and each backup_route provides backup protection to a plurality of primary_routes; and
   wherein any routes considered for inclusion into the primary_route_set and the backup_route_set are considered equally and the primary DFOS and backup DFOS sensor assignments are made as a one-step global optimization.

2. The method of claim 1 further comprising identifying, in the DFOS network, all possible fiber sensing routes constrained by a sensing range limit on each node as candidates for consideration for primary DFOS sensor assignment.

3. The method of claim 2 wherein all possible fiber sensing route trees in the DFOS network that are constrained by a sensing range limit on each node are considered as candidates for backup DFOS sensor assignment.

4. The method of claim 3 further wherein all primary DFOS candidates and backup DFOS are considered as candidates equally, applying a greedy algorithm, and selecting a minimum set of DFOS assignments from the primary candidates and the backup candidates such that each optical fiber link in the network is sensed at least once from two directions.

5. The method of claim 4 wherein for each individual optical fiber link that is shared by multiple primary_routes the number of backup_routes is greater than or equal to the number of sharing multiple primary_routes such that each primary_route has associated with it at least one backup_route when a single link failure occurs in the network.

6. The method of claim 5 wherein all primary_routes and backup_routes contain no loops and exhibit a distance that is less than a sensing range limit distance.

7. The method of claim 6 wherein backup_routes provide sensing functions from a direction opposite to that provided by primary_routes.

8. The method of claim 7 wherein the DFOS network provides Infrastructure as a Sensor (IaaS) services.

9. The method of claim 8 wherein the IaaS services provided include traffic and road condition monitoring.

10. The method of claim 1 wherein each optical link in the DFOS network is actively sensed via DFOS operation at least once from each direction.

* * * * *